United States Patent [19]

Ljungqvist et al.

[11] 4,231,836
[45] Nov. 4, 1980

[54] SYSTEM FOR AUTOMATIC JOINING AND ROLLING UP OF CORD STRIPS

[75] Inventors: Stig-Ove E. Ljungqvist; Bernth S. Hammarström; Sture F. E. Fritjofsson, all of Gislaved, Sweden

[73] Assignee: Gislaved AB, Gislaved, Sweden

[21] Appl. No.: 8,954

[22] Filed: Feb. 2, 1979

[51] Int. Cl.³ ............................................. B29H 9/04
[52] U.S. Cl. ............................ 156/405 P; 156/157; 156/421; 156/502
[58] Field of Search ............... 156/157, 158, 159, 304, 156/405, 421, 502, 504

[56] References Cited

U.S. PATENT DOCUMENTS

| | | | |
|---|---|---|---|
| 2,702,070 | 2/1955 | Lindemann | 156/502 |
| 3,433,690 | 3/1969 | Barns | 156/304 |
| 3,867,228 | 2/1975 | Brinkley et al. | 156/405 |
| 3,888,717 | 6/1975 | Koyama et al. | 156/159 X |
| 3,909,341 | 9/1975 | Moscovita | 156/304 |
| 3,935,056 | 1/1976 | Koyama et al. | 156/304 |
| 3,962,022 | 6/1976 | Bohasso et al. | 156/507 |
| 4,025,384 | 5/1977 | Shiozaki et al. | 156/304 |
| 4,088,527 | 5/1978 | Murase et al. | 156/304 X |

FOREIGN PATENT DOCUMENTS 374055 12/1972 Sweden.

*Primary Examiner*—John E. Kittle
*Attorney, Agent, or Firm*—Frishauf, Holtz, Goodman & Woodward

[57] ABSTRACT

Apparatus for automatically joining and winding up cord strips for tires includes a stationary table with a joining device movably mounted above the stationary table. The joining device comprises a carriage carrying a spring loaded roller which is spring loaded in a downward direction toward the stationary table, and a pair of pulleys located behind the spring loaded roller, relative to the direction of movement of the carriage, the pulleys being obliquely mounted at an angle toward each other for engaging respective ends of cord strips to be joined to draw the respective ends together when the roller and pulleys are rolled over the ends of the cord strips to be joined during movement of the carriage. The spring loaded roller presses down the ends of the cord strips to be joined on the stationary table and the pulleys draw together the pressed down edges of the cord strips to join them by the adhesiveness of the strip edges combined with the pressure imparted thereto by the obliquely mounted pulleys.

13 Claims, 9 Drawing Figures

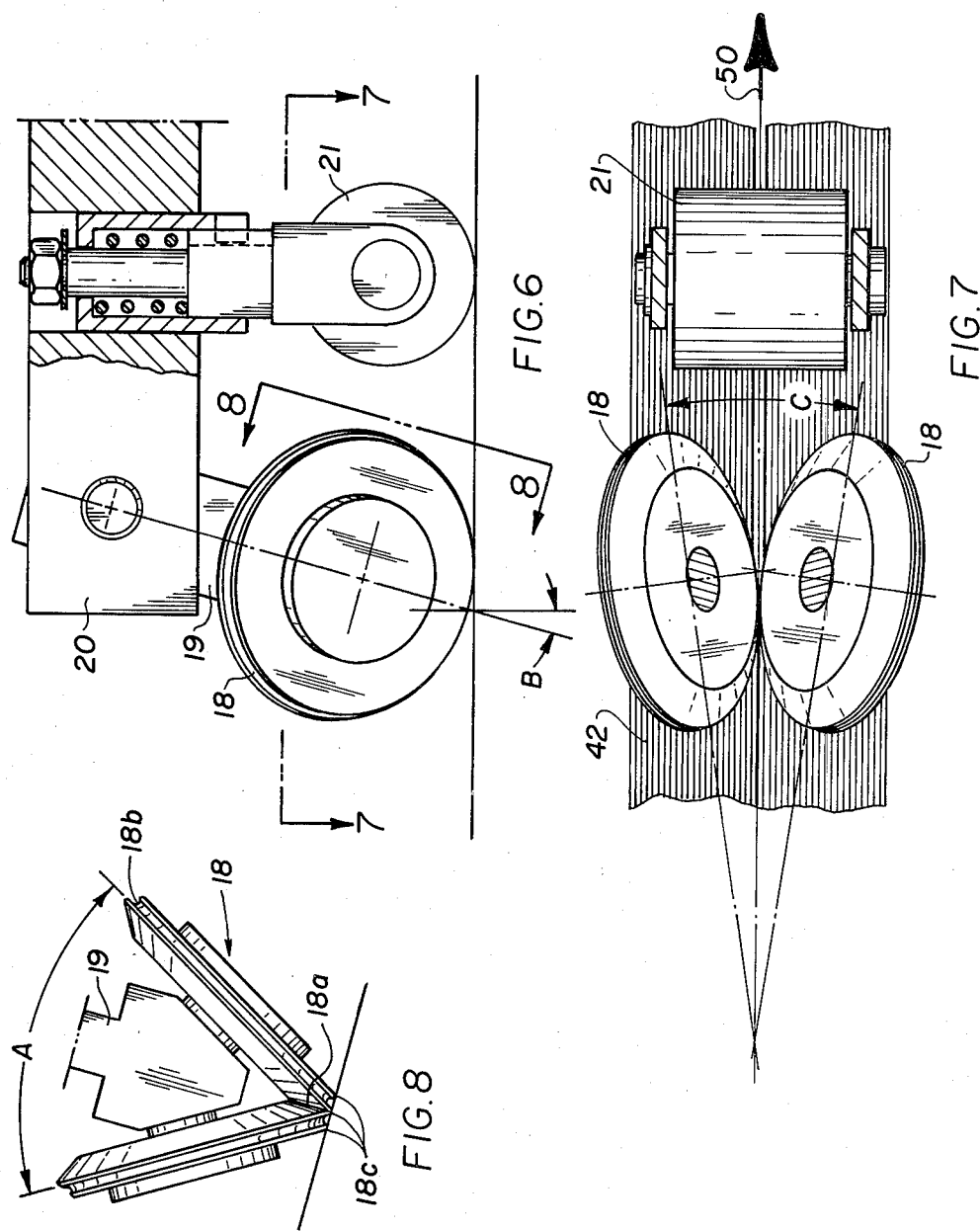

SYSTEM FOR AUTOMATIC JOINING AND ROLLING UP OF CORD STRIPS

BACKGROUND OF THE INVENTION

The present invention relates to a system for automatic joining and rolling up of cord strips for tires, for example motor car tires. Such cord strips generally cut with a defined breadth or width and with a definite angle against the longitudinal direction from outcalendered material, and have carcass wires which are surrounded by layers of unvulcanized rubber.

Formerly, cord strips of the above type have been joined and wound up either manually or by an automatic mechanism which is described in Swedish Pat. No. 374,055, the contents of which are incorporated herein by reference. By the system according to the present invention it has been possible to improve the automation process, improve the joining precision and increase capacity.

SUMMARY OF THE INVENTION

According to the present invention, apparatus for automatically joining cord strips comprises a stationary table; conveying means for conveying a cord strip to the stationary table; guide means mounted above the conveying means; and a joining device movably mounted above the conveying means and being movable into and out of registration with the stationary table. The joining device includes a movable carriage which is movably mounted on the guide means so as to move in a line above the joining line of the cord strips to be joined. The joining device further comprises a spring loaded roller on the movable carriage for pressing downward toward the stationary table and a pair of pulleys located behind the spring loaded roller, the pulleys being obliquely mounted at an angle toward each other and being adapted to engage respective ends of cord strips to be joined to draw the respective ends together when the roller and pulleys are rolled over the ends of the cord strips to be joined during movement of the carriage on the guide means. The spring loaded roller presses down the ends of the cord strips to be joined on the stationary table and the trailing pair of pulleys draw together the pressed down edges of the respective cord strips to join the edges by the adhesiveness of the strip edges combined with the pressure imparted thereto by the obliquely mounted pulleys.

BRIEF DESCRIPTION OF THE DRAWINGS

FIG. 6 is a side view of the joint device, which is part of the joining unit;

FIG. 7 is a top section view of the joint device taken along the line 7—7 in FIG. 6; and FIG. 8 is a side view of the two joining pulleys seen in the direction of motion indicated by the line 8—8 in FIG. 6.

DETAILED DESCRIPTION

Figure 2:
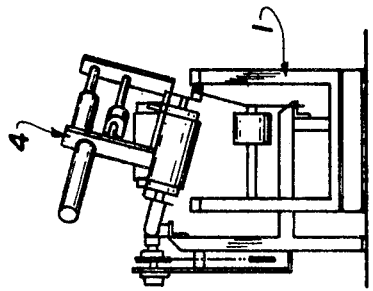
FIG. 2 is a left end view of the entire apparatus.
Figure 1:
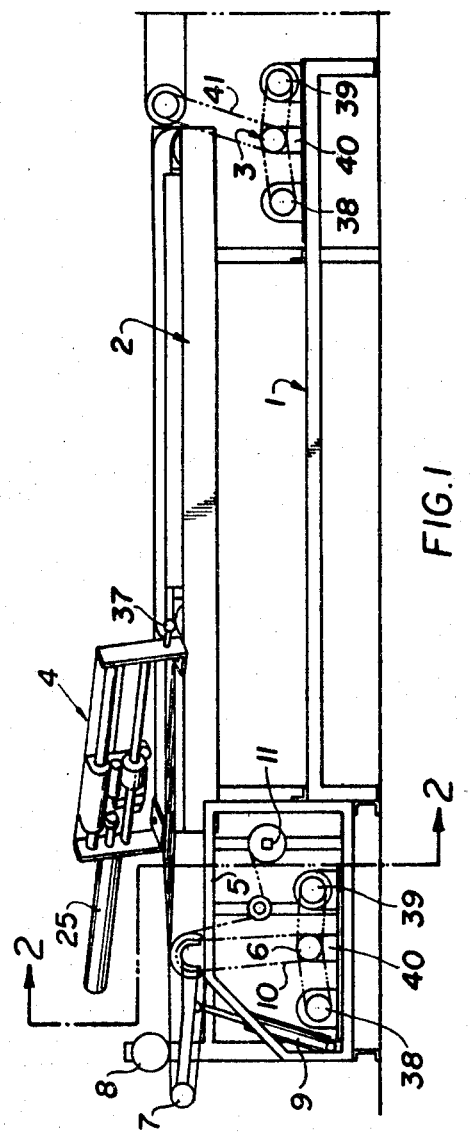
FIG. 1 is a side-view of the entire apparatus which comprises a conveyor, joining unit, reeling and driving device.
Figure 3:
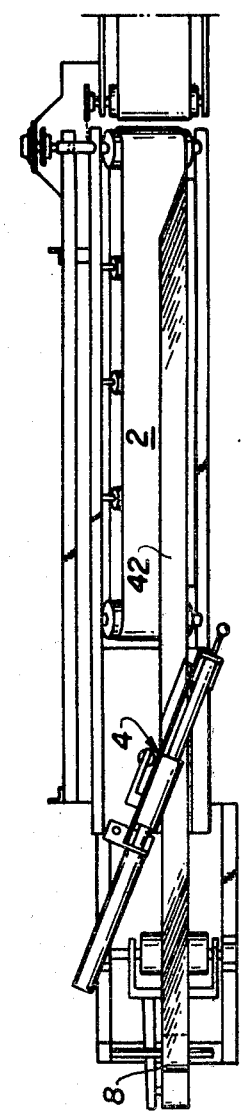
FIG. 3 is a top view of the entire device.

Referring to FIGS. 1–3, a stand 1 supports the conveyor 2, the driving device 3 and the joining device 4. The reeling unit comprises support 5, driving unit 6, folding transmission 7, winding up axle 8, operating cylinder 9, transmission 10 and an unwinding axle for liner 11.

Figure 4:
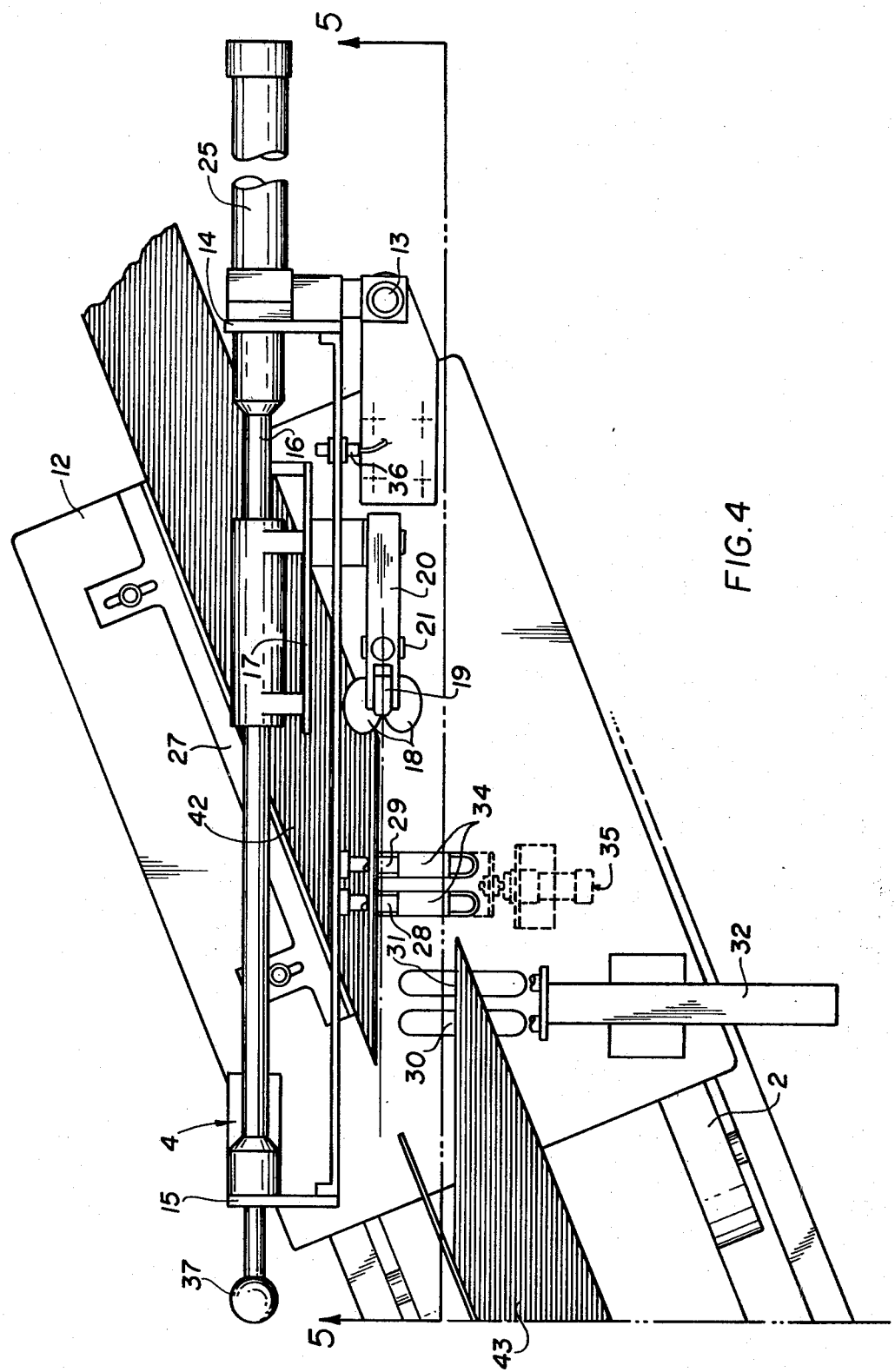
FIG. 4 is a top view of the joining unit.
Figure 5:
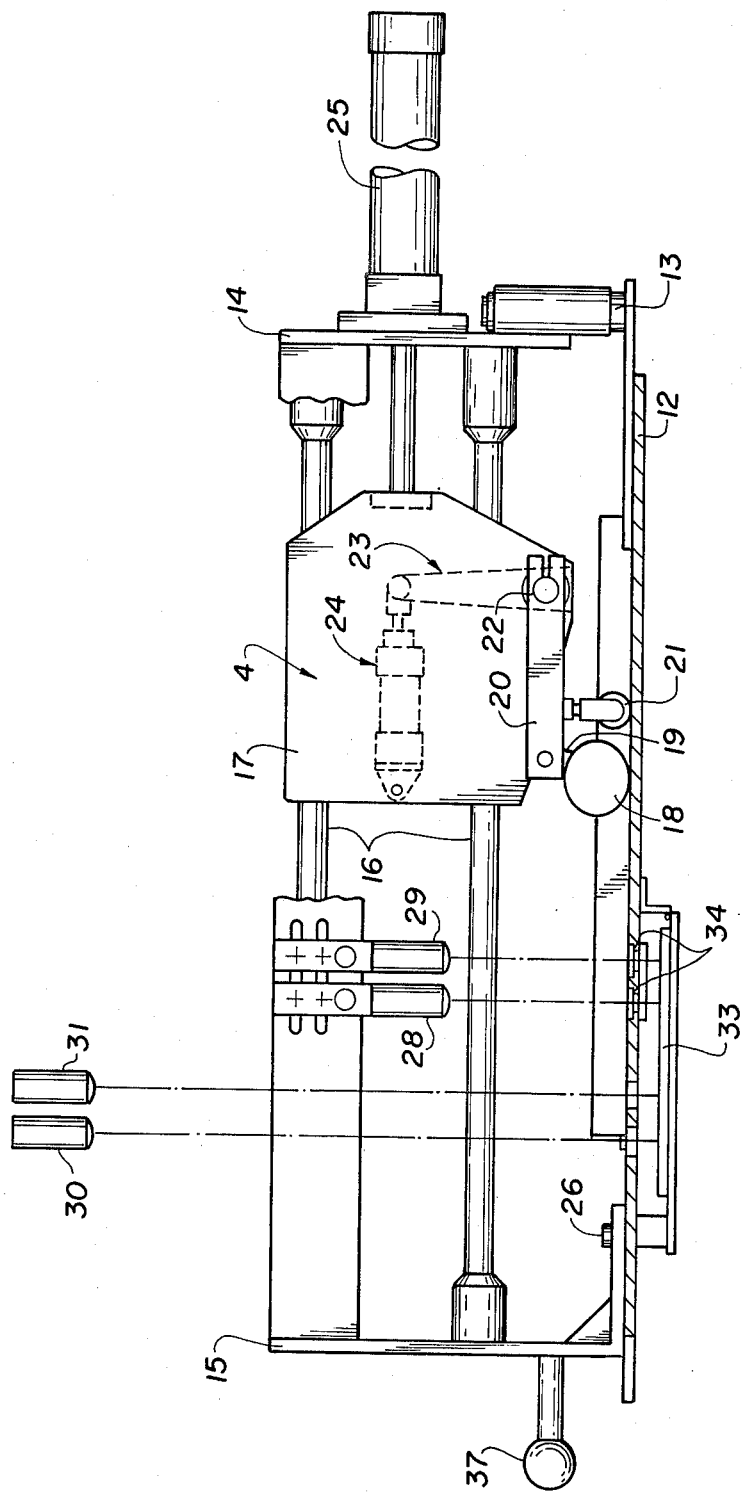
FIG. 5 is a side sectional view of the joining unit taken along the line 5—5 in FIG. 4.

Referring to FIGS. 4 and 5, the joining unit 4 comprises a table 12 having a fixed pin 13 thereon. A slewing guide bridge is mounted to fixed pin 13 via bearings. The slewing guide bridge comprises ending fittings 14 and 15 and guides 16 extending between end fittings 14 and 15. A carriage 17 runs on the guides 16. The carriage 17, which supports the joint device itself (FIG. 6), comprises two obliquely mounted pulleys 18, revolving bracket 19, folding arm 20, spring loaded pushing roller 21, axle 22 (FIG. 5) with an operating arm 23 connected thereto and an air piston 24.

The motion to and fro of the carriage 17 on guides 16 is controlled by an air piston 25. The guide bridge is fixed at the left end by a pin 26 (FIG. 5) which is adjustable laterally for adjustment of the angle between the guide bridge and the longitudinal direction of the table 12.

As seen in FIG. 8, the pulleys 18 of the joining device are mounted to a bracket 19 via bearings so as to form an angle A of 60° with respect to each other. The shape of the two pulleys 18 in their circumferential parts is of such a coned nature, that the meeting inside of the pulleys have a common contact surface 18a. The parts 18b of the pulleys which face the cord strips have circumferences which concentrically define a trace of a given breadth, on both sides all around about the edges of the pulleys forming elevations 18c. Elevation portions 18c bear against the cord strips. In order to give the pulleys their contracting function, the bracket 19 is arranged at a certain angle B (FIG. 6) for instance 15°, against the normal or vertical line of the table 12.

When the pulleys 18 run over the joint between two cord strips, with the roller 21 leading the pulleys 18 to prevent overlap of the edges of the cord strips being joined, the joint edges of the two cord strips are accurately fixed in position so that each of the edges of the cord strip joint are rolled over by a respective one of the oblique pulleys 18. The ends of the cord strips to be joined are drawn together by the friction between pulleys 18 and cord strips and by the angular adjustment (angle C as seen in FIG. 7) in relation to the direction of motion of the cord strip. The angle C is dependent on the angle B and is adjusted as a function of angle B. The roller 21 and pulleys 18 are moved in the direction indicated by the arrow 50 in FIG. 7. Before the steel cord strip is cut, the edges are coated with a cement. This increases the stickiness or adhesiveness so much, that the pressure exerted by the pulleys 18 of the joining device is large enough to make a strong joint. The splicing is made end-to-end, without overlap of the cord strips.

On the table 12, there is an adjustable guide rail 27 (FIG. 4) for guiding the cord strips, as seen in FIG. 3.

As seen in FIGS. 4 and 5, two photocells 28 and 29 are mounted on the guide bridge for precision adjustment of the joint ends at the cord strip before the joining. For changing over to slow-conveying speed of conveyor 2, there are two photocells 30 and 31, which are mounted on a bracket 32. The light beams of the photocells 28–31 are reflected by a mirror 33 through corresponding openings in the table 12, as best seen in FIG. 5.

Behind the openings for the two photocells 28 and 29, there are sliding lids 34, which are operated by an air piston 35 (FIG. 4). On the guide bridge, there is also mounted a sensor 36, adjustable in longitudinal direction, FIG. 4, which gives a signal when the joining turn is accomplished.

The whole joining device 4 can be folded to the side at manual joining and is at that time lifted by means of the bracket 37 from the pin 26 and is turned around the pin 13. See FIG. 5.

The two driving devices 3 and 6 are identical so the same reference numerals are used for the constituents thereof. Each driving device comprises a high speed motor 38, a slow speed motor 39, a combined clutch brake 40 and transmission 41 (drive 3) or 10 (drive 6).

When a joining of cord strips is accomplished, the joining device runs over the end of a first cord strip 42, and the sensor 36 (FIG. 4) generates a signal, which causes the joining device to be lifted and to start the winding up. The joining device winds in the cord strips at a high speed on the roll on axle 8 (FIG. 1). At the same time, the carriage with the joining device returns to its starting point at the left side of the apparatus.

The strip is steered during the winding up by the guide rail 27, towards which it slides under the influence of the inclination of the table. The winding up continues until the photocell 30 (FIG. 4) has been exposed, at which time the slow winding up speed starts. This continues until the photocell 29 is exposed, at which point the winding up process stops.

A new cord strip 43 is then fed onto the conveyor 2 from a guillotine on the right side of the apparatus as seen in FIG. 1, and is transported by the conveyor 2 to the joining device 4. The cord strip 43 is fixed in position, during the transport, sideways toward the rail 27 to a proper position as seen in FIG. 4. The photocell 31 is covered and the slow speed conveyings begins. The conveying movement of new cord strip 43 is stopped when the photocell 28 is covered. See FIG. 4. The ends of the cord strips 42,43 are now in an opposing joining position and air piston 35 (FIG. 4) is operated to cause the sliding lids 34 (FIGS. 4 and 5) to shut the openings in the table at the same time as the joining device lowers (by means of air piston 24—FIG. 5) and runs over the joint. The openings must be shut by lids 34 before the roll 21 and pulleys 18 of the joining device roll over the joint. The lowered roll 21 presses the ends of the cord strips against the table 12 and prevents overlapping when the following pulleys 18 run over the ends of the cord strips. The roller 21 and pulleys 18 move from left to right in FIG. 4 during the joining operation. Due to their angular adjustment, pulleys 18 draw the ends of the cord strips together. A durable joint is formed by the adhesiveness of the material of the cord strips and the applied pressure.

When the joining is accomplished by passing the roll 21 and the following pulleys 18 over the cord strips, the sensor 36 is actuated again and the cycle is repeated.

Figure 9:
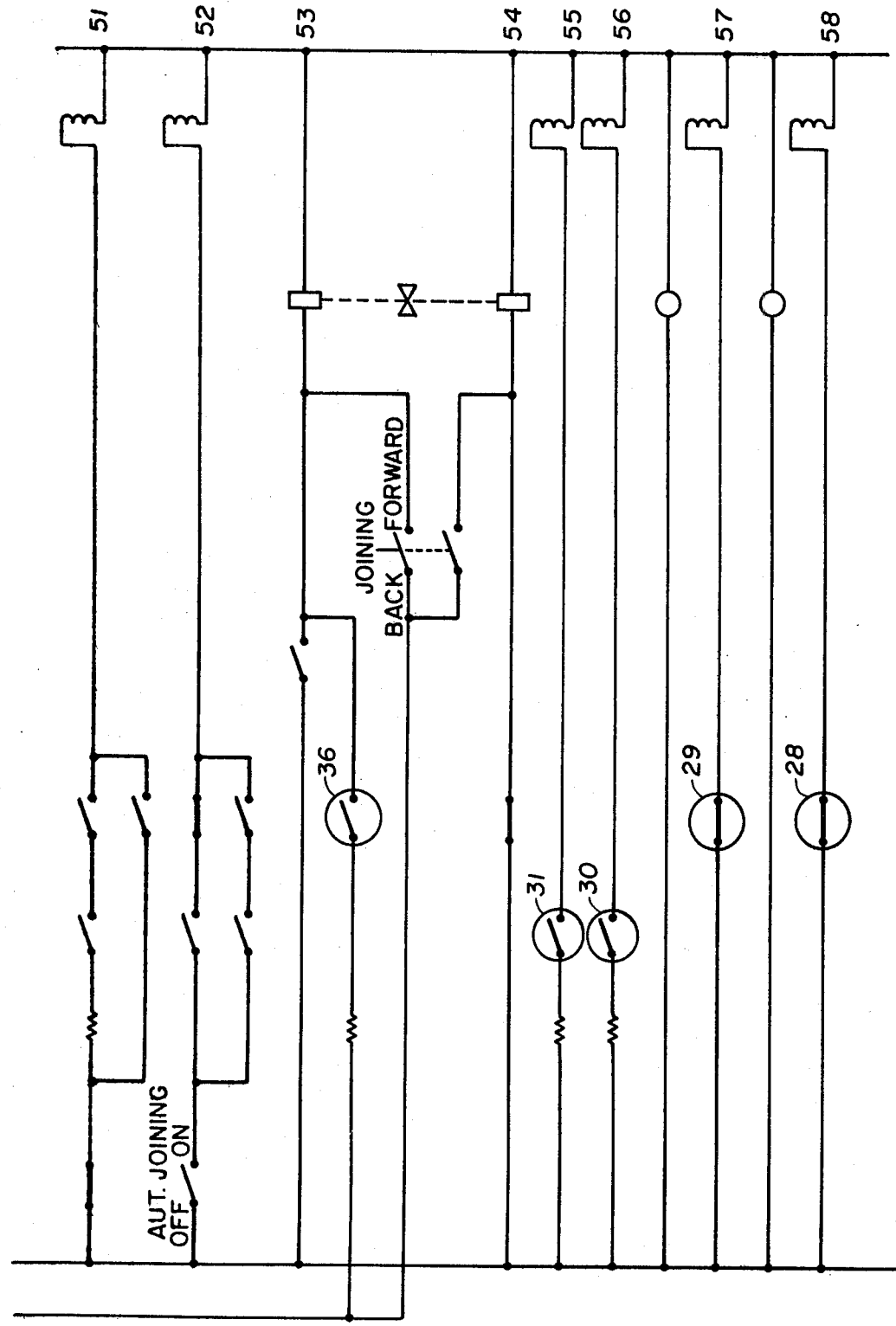
FIG. 9 is a wiring-diagram showing the control circuit for operating the machine.

On the wiring-diagram, FIG. 9, the diffferent parts have reference numbers as follows:

28—Photocell
29—Photocell
30—Photocell or sensor
31—Photocell or sensor
36—Sensor
51—Auxiliary relay start
52—Auxiliary relay cutting
53,54—Solenoid valve
55—Auxiliary relay for photocell or sensor (30)
56—Auxiliary relay for photocell or sensor (31)
57—Auxiliary relay for photocell (29)
58—Auxiliary relay for photocell (28)

A brief explanation how the photocells and the sensor work is done on page 7, line 10–23, and on page 8, line 1–13.

We claim:

1. Apparatus for automatically joining cord strips (42,43) for tires, such as vehicular tires, comprising:
    a stationary table (12);
    conveying means (2) for conveying a cord strip (42) to said stationary table (12);
    guide means (16) mounted above said conveying means; and
    a joining device (4) movably mounted above said conveying means (2) and being movable into and out of registration with said stationary table (12), said joining device comprising a movable carriage (17) movably mounted on said guide means so as to move in a line above the joining line of said cord strips to be joined;
    said joining device further comprising a spring loaded roller (21) on said movable carriage which is spring loaded in a downward direction toward said stationary table; and a pair of pulleys (18) located behind said spring loaded roller (21) in the direction of movement of said joining device during a joining operation, said pulleys being obliquely mounted at an angle toward each other and each having a circumferential bearing surface for engaging respective ends of cord strips to be joined to draw said respective ends together substantially when said roller and pulleys are rolled over the ends of said cord strips to be joined during movement of said carriage (17) on said guide means, said obliquely mounted pulleys having substantially conical shaped circumferential portions on the inner facing adjacent surfaces thereof such that the inner parts of said pulleys have an extended common contact surface (18a), said spring loaded roller (21) pressing down said ends of said cord strips to be joined on said stationary table (12) and said trailing pair of pulleys (18) drawing together said pressed down edges of said respective cord strips to join said respective edges by the adhesiveness of said strip edges combined with the pressure imparted thereto by said obliquely mounted pulleys (18).

2. Apparatus according to claim 1 wherein said roller and pulleys are movable into and out of registration with said stationary table.

3. Apparatus according to claim 1 wherein said pulleys have, about their circumferences, coned surfaces so as to each provide a pair of bearing surfaces (18c) spaced apart from each other for bearing against the joining edges of the cord strips to be joined and to draw them together during said joining.

4. Apparatus according to claim 1 wherein said pulleys are mounted to form an angle (A) of about 60° with respect to each other in the vertical direction.

5. Apparatus according to claim 5 wherein said pulleys are mounted to a bracket oriented at an angle (B) of about 15° with respect to the perpendicular line of said stationary table.

6. Apparatus according to claim 1 wherein said pulleys are mounted to a bracket oriented at an angle (B) of about 15° with respect to the perpendicular line of said stationary table.

7. Apparatus according to claim 1 wherein said pulleys are mounted to form a generally V-shaped configuration relative to each other.

8. Apparatus according to claim 1 wherein said stationary table (12) is inclined and has a guide rail thereon at a portion lower than the uppermost portion thereof, such that during transport and joining of cord strips, the cord strips are slideable against said guide rail to be oriented in the appropriate joining condition.

9. Apparatus according to claim 1 further comprising sensing means adjacent said stationary table for sensing the presence of cord strips and for controlling the driving of said conveying means and movement of said movable carriage (17) of said joining device.

10. Apparatus according to claim 9 wherein said sensing means comprising a plurality of photocells for sensing the presence of said cord strips.

11. Apparatus according to claim 1 further comprising a winding means at an end thereof for rolling up cord strips.

12. Apparatus according to claim 1 wherein said roller (21) presses downward with sufficient force to substantially prevent overlap of said cord strips being joined.

13. Apparatus according to claim 12 further comprising sensing means for sensing the presence of a cord strip and for operating said winding means responsive to said sensing.

* * * * *

UNITED STATES PATENT AND TRADEMARK OFFICE
CERTIFICATE OF CORRECTION

PATENT NO. : 4,231,836
DATED : November 4, 1980
INVENTOR(S) : Stig-Ove E. LJUNGQVIST et al It is certified that error appears in the above-identified patent and that said Letters Patent are hereby corrected as shown below:

Column 4 (claim 4), line 63, change "are mounted"
    to --are obliquely mounted--;

Column 5 (claim 7), line 6, change "are mounted"
    to --are obliquely mounted--.

Signed and Sealed this

Third Day of March 1981

[SEAL]

Attest:

RENE D. TEGTMEYER

Attesting Officer    Acting Commissioner of Patents and Trademarks